(12) United States Patent
Zhang et al.

(10) Patent No.: US 8,824,451 B2
(45) Date of Patent: Sep. 2, 2014

(54) METHOD AND SYSTEM FOR ESTABLISHING AN ASSOCIATED BIDIRECTIONAL LABEL-SWITCHED PATH

(75) Inventors: Fei Zhang, Shenzhen (CN); Fan Yang, Shenzhen (CN); Lizhong Jin, Shenzhen (CN); Weilian Jiang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 65 days.

(21) Appl. No.: 13/581,269

(22) PCT Filed: Dec. 9, 2010

(86) PCT No.: PCT/CN2010/079630
§ 371 (c)(1),
(2), (4) Date: Nov. 8, 2012

(87) PCT Pub. No.: WO2011/103759
PCT Pub. Date: Sep. 1, 2011

(65) Prior Publication Data
US 2013/0058324 A1 Mar. 7, 2013

(30) Foreign Application Priority Data
Feb. 26, 2010 (CN) .......................... 2010 1 0135171

(51) Int. Cl.
*H04L 12/28* (2006.01)
*H04L 12/56* (2006.01)
(52) U.S. Cl.
CPC ................ *H04L 45/50* (2013.01); *H04L 47/00* (2013.01); *H04L 45/00* (2013.01)
USPC ........... 370/351; 370/389; 370/400; 370/216; 370/254; 709/239; 709/240
(58) Field of Classification Search
CPC ................................ H04L 45/00; H04L 47/00
See application file for complete search history.

(56) References Cited

U.S. PATENT DOCUMENTS 7,751,405 B1 * 7/2010 Kompella .................. 370/395.2
8,014,380 B2 * 9/2011 Lewis .......................... 370/351
(Continued)

FOREIGN PATENT DOCUMENTS

| CN | 1510874 | 7/2004 |
|----|---------|--------|
| CN | 1859431 | 11/2006 |
| EP | 2 101 452 | 9/2009 |

OTHER PUBLICATIONS

Zhang et al., Infrastructure of GMPLS-based Intelligent Optical Network and Key Technology, Photon Technology, Dec. 2003, No. 2, pp. 102-106.

(Continued)

*Primary Examiner* — Kibrom T Hailu
(74) *Attorney, Agent, or Firm* — Pearl Cohen Zedek Latzer Baratz LLP

(57) ABSTRACT

The disclosure discloses a method and a system for establishing an associated bidirectional Label-Switched Path (LSP). The method includes the following steps: a head node sends a PATH message for establishing or updating an LSP to an end node, wherein the message carries an object for identifying association; the end node sends to the head node a PATH message for establishing or updating an LSP as a reverse LSP corresponding to the above LSP, wherein the message carries an object for identifying association; in the case that the attributes of the objects for identifying association carried in the PATH messages sent by the head node and the end node are the same, the LSP and the reverse LSP are associated with each other by the head node and the end node and become an associated bidirectional LSP. The method for establishing an associated bidirectional LSP in the disclosure can be applied to transition from a Multi-Protocol Label Switching (MPLS) network to a MPLS-Transport Profile (MPLS-TP) network and binding a reverse LSP with a unidirectional LSP.

19 Claims, 3 Drawing Sheets

(56) References Cited

U.S. PATENT DOCUMENTS

| | | | | |
|---|---|---|---|---|
| 8,018,952 | B1* | 9/2011 | Ayyangar | 370/396 |
| 8,208,469 | B2* | 6/2012 | Tochio | 370/392 |
| 8,599,849 | B2* | 12/2013 | Aggarwal et al. | 370/390 |
| 2007/0133406 | A1* | 6/2007 | Vasseur | 370/230 |
| 2008/0310429 | A1* | 12/2008 | Klink | 370/400 |
| 2010/0124231 | A1* | 5/2010 | Kompella | 370/401 |

OTHER PUBLICATIONS

Yu Shengyun, Research of MPLS Application in NGN, Optical Communication Technology, Oct. 2004, No. 10, pp. 35-36.

Mao Dongfeng et al., Method to Create Light-path Fast in ASON, Optical Communication Technology, Jun. 2003, No. 6, pp. 22-24.

Lu Lihua et al., Unified Control Plane of Optical Network, Optical Communication Technology, Oct. 2003, No. 10, pp. 7-10.

International Search Report for Application No. PCT/CN2010/079630 mailed Mar. 10, 2011.

M. Chen, J. Dong, X. Guo, "GACH Based Bidirectional LSP Association; draft-chen-mpls-tp-bidir-lsp-association-00.txt", Standard Working Draft, Huawei Technologies, Network Working Group, Internet Engineering Task Force (IETF), Internet Society, Jul. 5, 2010.

Extended European Search Report for European Patent Application Publication No. EP10 84 6382 issued Mar. 6, 2014.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Length              |  Type-Num (199) |   C-type (1) |
+-+-+-+-+-+-+-+-+-+-+-+-+-+-+-+-+-+-+-+-+-+-+-+-+-+-+-+-+-+-+-+-+
|        Association Type       |         Association ID        |
+-+-+-+-+-+-+-+-+-+-+-+-+-+-+-+-+-+-+-+-+-+-+-+-+-+-+-+-+-+-+-+-+
|                      IPv4 Association Source                  |
+-+-+-+-+-+-+-+-+-+-+-+-+-+-+-+-+-+-+-+-+-+-+-+-+-+-+-+-+-+-+-+-+
```

Fig. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Length              |  Type-Num (199) |  C-type (2)  |
+-+-+-+-+-+-+-+-+-+-+-+-+-+-+-+-+-+-+-+-+-+-+-+-+-+-+-+-+-+-+-+-+
|        Association Type       |         Association ID        |
+-+-+-+-+-+-+-+-+-+-+-+-+-+-+-+-+-+-+-+-+-+-+-+-+-+-+-+-+-+-+-+-+
|                                                               |
|                                                               |
|                      IPv6 Association Source                  |
|                                                               |
|                                                               |
+-+-+-+-+-+-+-+-+-+-+-+-+-+-+-+-+-+-+-+-+-+-+-+-+-+-+-+-+-+-+-+-+
```

Fig. 4

METHOD AND SYSTEM FOR ESTABLISHING AN ASSOCIATED BIDIRECTIONAL LABEL-SWITCHED PATH

CROSS-REFERENCE TO RELATED APPLICATIONS

This application is a National Phase Application of PCT International Application No. PCT/CN2010/079630, International Filing Date Dec. 9, 2010, claiming priority of Chinese Patent Application No. 201010135171.7, filed Feb. 26, 2010, which is hereby incorporated by reference.

FIELD OF THE INVENTION

The disclosure relates to the communication field, and more particularly to a method and a system for establishing an associated bidirectional Label-Switched Path (LSP).

BACKGROUND OF THE INVENTION

With continuous development of Packet Transport Network (PTN) technology, the PTN network will become the major access technology for every network operator. The currently defined PTN network includes, but is not limited to the following networks: Multi-Protocol Label Switching (MPLS) network, Transport-MPLS (T-MPLS), MPLS-Transport Profile (MPLS-TP) network, Ethernet etc.

Establishment of a bidirectional LSP is of importance in PTN. And bidirectional LSPs can be classified into co-routed bidirectional LSPs and associated bidirectional LSPs. In a transmission network, because of needs in aspects such as time delay/protection/Operations, Administration and Management (OAM) detection etc. a data stream, if bidirectional, needs to pass through the same path. Because of this, RFC3473 puts forward a method for establishing a co-routed bidirectional LSP by using an upstream label.

If a PTN network is used to bear Virtual Private Network (VPN) services, then two Provide Edge (PE) endpoints are required to have a strategy controllable ability for an outer layer LSP of the same L2VPN\L3VPN, such strategy controllable ability including: consistent service levels, consistent protection etc. In addition, with the application of T-MPLS OAM and the emergence of protection among tunnels, bidirectional detection of associated switching is involved, which means that two PE endpoints need to be bound explicitly, and two unidirectional LSPs need to be associated to become a tunnel with bidirectional attributes. However, there are only unidirectional LSPs in MPLS (Multi-protocol Label Switching) packet protocols. Because of this, it is put forward in RFC5654 that the MPLS-TP must support establishment of an associated bidirectional LSP. Thus, two unidirectional LSPs can be associated controllably to maintain a unidirectional signalling docking ability, to maintain the compatibility with MPLS unidirectional LSPs of various versions and so as to operate services.

FIG. 1 is a schematic diagram illustrating LSP1/LSP2 binding of the related art. As shown in FIG. 1, LSP1 (A-D-B) and LSP2 (B-D-C-A), which are two Traffic Engineering (TE) tunnels in opposite directions, need to be associated to become a bidirectional LSP. In the related implementation scheme, binding of two reverse LSPs are designated statically at a head node and an end node. This scheme has the following shortages: (1) during the binding of the head node and the end node, a bidirectional forwarding item needs to be generated first and the existing unidirectional forwarding item is deleted subsequently, thus causing multiple interactions between a control plane and a forwarding plane, and influencing the establishment efficiency of LSPs; and (2) interference of a network management plane: two LSPs which need to be bound are designated by a network management plane with a complex process, and mismatching of two ends is possible.

SUMMARY OF THE INVENTION

The main purpose of the disclosure is to provide a scheme for establishing an associated bidirectional LSP to at least solve the problems above.

According to one aspect of the disclosure, a method for establishing an associated bidirectional LSP is provided, comprising the following steps: a head node sending a PATH message for establishing or updating an LSP to an end node, wherein the message carries an object for identifying association; the end node sending to the head node a PATH message for establishing or updating an LSP as a reverse LSP corresponding to the LSP, wherein the message carries an object for identifying association; and in a case that the attribute values of the objects for identifying association carried in the PATH messages sent by the head node and the end node are the same, the LSP and the reverse LSP being associated by the head node and the end node and becoming the associated bidirectional LSP.

Preferably, both the attributes of the object for identifying association carried in the PATH message sent by the head node and the attributes of the object for identifying association carried in the PATH message sent by the end node comprise: an association type attribute configured to indicate association of a reverse LSP for the LSP, and an attribute configured to uniquely identify the LSP.

Preferably, the same node in the LSP and the reverse LSP associates these two LSPs in the case that the attribute values of the objects for identifying association carried in the PATH messages sent by the head node and the end node are the same.

Preferably, the end node sending to the head node a PATH message for establishing or updating an LSP as a reverse LSP comprises: the end node sending a PATH message to the head node according to a Traffic Engineering (TE) attribute of the LSP to establish the reverse LSP to the head node, which message carries an object for identifying association.

Preferably, the end node sending a PATH message for establishing or updating an LSP as a reverse LSP to the head node comprises: the end node, according to a TE attribute of the LSP, selecting an LSP in LSPs which have been established, sending a PATH updating message carrying an object for identifying association on the selected LSP, and taking the selected LSP as the reverse LSP.

Preferably, the method further comprises: in a case that the LSP and the reverse LSP are established at the same time, the head node of the LSP or the head node of the reverse LSP carrying the same object for identifying association in a subsequent PATH updating message according to a preset strategy to associate the LSP and the reverse LSP.

Preferably, the preset strategy is that in the head node of the LSP and the head node of the reverse LSP, the node with a greater or smaller ID value is an initiative side, and in the PATH updating message the object for identifying association in an original PATH message of the initiative side is replaced by the object for identifying association in the PATH message of the other node.

Preferably, the method further comprises: in a case that the attribute configured to indicate association of a reverse LSP for the LSP of the object for identifying association cannot be identified, a node which receives the PATH message returning an error message to a node which sends the PATH message to indicate that the value of attribute of the object for identifying association cannot be identified, and stopping establishing the LSP to be established by the PATH message.

Preferably, the method further comprises: in a case that the attribute configured to indicate association of a reverse LSP for the LSP of the object for identifying association cannot be identified, a node which receives the PATH message continuing establishing the LSP to be established by the PATH message.

Preferably, the object is an association object and the association type of the association object is configured to indicate association of a reverse LSP for the LSP; and, the association object further carries an attribute configured to indicate node information of the head node or the end node, and a unique identifier of the LSP under the node, wherein the unique identifier of the LSP under the node and the attribute configured to indicate the node information of the head node or the end node are used to identify an LSP uniquely and globally.

Preferably, the association ID in the association object is set as identification information of the LSP, and the association source of the association object is configured to indicate the node information of the head node or the end node; or, a Type/Length/Value (TLV) is extended and set in the association object, wherein the TLV carries node information configured to indicate the head node or the end node and identification information configured to identify the LSP under the node.

According to another aspect of the disclosure, a system for establishing an associated bidirectional LSP is further provided, comprising a plurality of nodes; and the node of the plurality of nodes comprises: a signalling sending/receiving module, configured to send and/or receive a PATH message for establishing or updating a LSP to an end node, wherein the PATH message carries object for identifying association; a message storage module, configured to store status information of the LSP, wherein the status information includes the PATH message and the object for identifying association carried in the PATH message; and an association module, configured to search the object for identifying association in the PATH message stored in the message storage module and associate LSPs of which the objects for identifying association have the same attribute value.

Preferably, the attributes of the object for identifying association comprise: association type attribute configured to indicate association of a reverse LSP for the LSP, and attribute configured to uniquely identify the LSP.

Preferably, in a case that the node is taken as the end node, the signalling sending/receiving module is further configured to, according to the Traffic Engineering (TE) attribute of the LSP, send to the head node of the LSP a PATH message for establishing an LSP as a reverse LSP of the LSP, or the signalling sending/receiving module is further configured to, according to the TE attribute of the LSP, select an LSP in LSPs which have been established, and send a PATH updating message carrying an object for identifying association on the selected LSP to take the selected LSP as a reverse LSP, wherein the PATH message and the PATH updating message carry an object for identifying association with the same attribute values as the attribute values of the object for identifying association carried in the PATH message for establishing the LSP.

Preferably, the signalling sending/receiving module is further configured to, in a case that the attribute configured to indicate association of a reverse LSP with the LSP of the object for identifying association cannot be identified, return an error message to a node which sent the PATH message to indicate that the attribute values of the object for identifying association cannot be identified.

By applying the solution of the disclosure, a head node sends a PATH message for establishing or updating an LSP to an end node, wherein the message carries an object for identifying association. The end node sends to the head node a PATH message for establishing or updating an LSP as a reverse LSP corresponding to the LSP, wherein the message carries an object for identifying association. Both the attributes of the object for identifying association carried in the PATH message sent by the head node and the attributes of the object for identifying association carried in the PATH message sent by the end node include: association type attributes configured to indicate association of a reverse LSP with the LSP, and attributes configured to uniquely identify the LSP. In the case that the attribute values of the objects for identifying association carried in the PATH messages sent by the head node and the end node are the same, the LSP and the reverse LSP are associated with by the head node and the end node and become an associated bidirectional LSP. Thus, the solution of this disclosure solves problems caused by associating a bidirectional LSP statically at the head node and the end node in the related art, simplifies the process for associating the bidirectional LSP and increases efficiency.

BRIEF DESCRIPTION OF THE DRAWINGS

The drawings illustrated herein provide further understanding to the disclosure and constitute a part of the application. The exemplary embodiments of the disclosure and the illustrations thereof are used for explaining the disclosure, but not for constituting an improper limitation to the disclosure. In the drawings:

FIG. 3 is a schematic diagram illustrating a format of an IPv4 association object according to one embodiment of the disclosure;

FIG. 4 is a schematic diagram illustrating a format of an IPv6 association object according to one embodiment of the disclosure.

DETAILED DESCRIPTION OF THE EMBODIMENTS

The disclosure will be described in details below with reference to the drawings and in combination with the embodiments. It should be noted that, if there is no conflict, the embodiments in the application and the features in the embodiments can be combined with one another.

Figure 1:
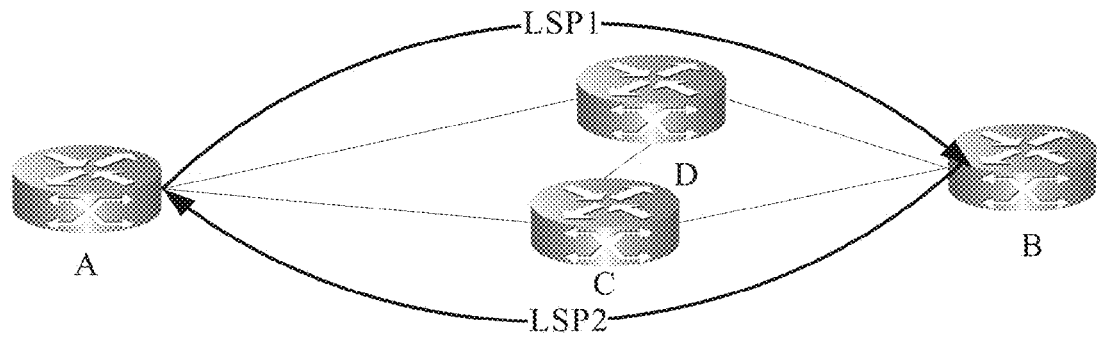
FIG. 1 is a schematic diagram illustrating LSP1/LSP2 binding of the related art.
Figure 2:
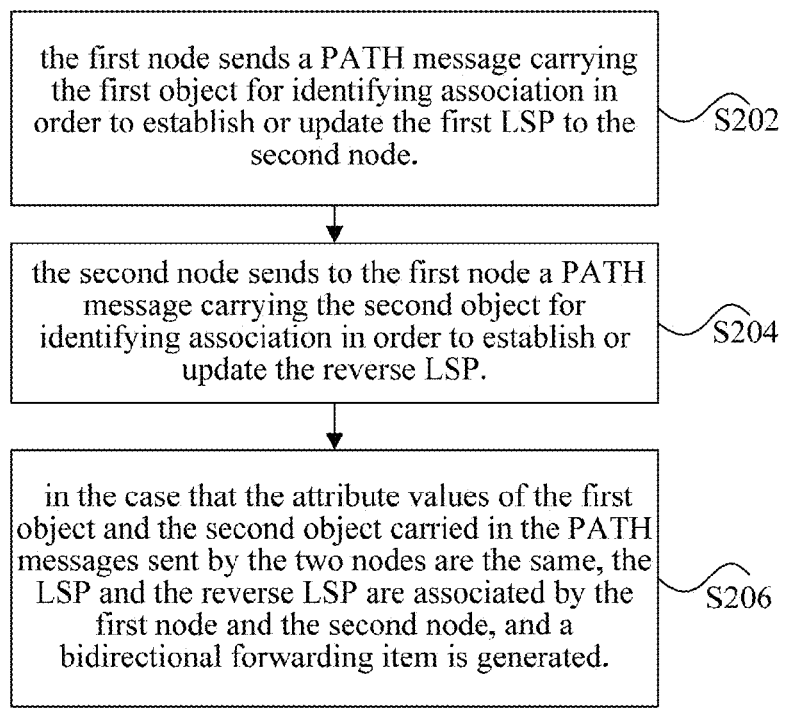
FIG. 2 is a flowchart illustrating a method for establishing an associated bidirectional LSP according to one embodiment of the disclosure.

In one embodiment, a method for establishing an associated bidirectional LSP is provided. In the method, in order to facilitate description, a first node (also known as Node A) is taken as the head node of an LSP (LSP1), a second node (also known as Node B) is taken as the end node of the LSP, the second node is taken as the head node of a reverse LSP (known as the second LSP, i.e. LSP2) of the above LSP, and the first node is taken as the end node of the reverse LSP. FIG. 2 is a flowchart illustrating a method for establishing an associated bidirectional LSP according to one embodiment of the disclosure. As shown in FIG. 2, the process includes the following steps:

Step S202: the first node sends a PATH message carrying a first object for identifying association in order to establish or update a first LSP to a second node. Preferably, the first object may include: an association type attribute (to facilitate description, it is called the first attribute) configured to indicate association of a reverse LSP for the LSP and an attribute (to facilitate description, it is called the second attribute) configured to identify the LSP uniquely;

Step S204: the second node sends to the first node a PATH message carrying a second object for identifying association in order to establish or update the reverse LSP. Preferably, the second object includes the first attribute and the second attribute, and the attribute values of the two are the same as those of the first object; and Step S206: in the case that the attribute values of the first object and the second object carried in the PATH messages sent by the two nodes are the same, the LSP and the reverse LSP are associated by the first node and the second node, and a bidirectional forwarding item is generated.

Through the above Step S202 to Step S206, when the head node, the end node and intermediate nodes try to establish a bidirectional LSP, association can be performed according to the objects carried in the PATH messages, thus reducing processes of interactions, and eliminating interactions between a control plane and a forwarding plane to increase efficiency.

Preferably, the LSP and the reverse LSP corresponding to the objects with the same values of the first attribute and the second attribute are associated by the same node in the LSP and the reverse LSP, and the bidirectional forwarding item is generated.

In Step S204, the second node may establish a new LSP as a reverse LSP, or the second node may also select an LSP as a reverse LSP from LSPs which have been generated. Description will be given hereinafter respectively.

The second node establishes an LSP as a reverse LSP: the second node, according to the TE attribute of an LSP, sends a PATH message carrying the second object to the first node, in order to establish a reverse LSP to the first node.

The second node takes an existing LSP as a reverse LSP: the second node, according to the TE attribute of an LSP, selects an LSP from LSPs which have been established, and sends a PATH updating message carrying the second object on the selected LSP to take the selected LSP as a reverse LSP.

It should be noted that, the above Step S202 and Step S204 may be performed without a sequence. If the LSP and the reverse LSP are established at the same time, i.e. in the case that the first LSP and the second LSP are established at the same time, the head node of the first LSP or the head node of the second LSP may select a node according to a preset strategy. The node sends a PATH updating message on the corresponding LSP to associate the first LSP and the second LSP, wherein the PATH message carries an object which is the same as the object in the other LSP. For example, if the ID of the first node is greater, then the first node determines to associate the first LSP and the second LSP, and then in the PATH updating message of the first LSP, the first node replaces the object in the first LSP with the object in the second LSP, thus ensuring that the objects in the first LSP and the second LSP are the same.

Preferably, if the node which receives the PATH message fails to identify the object carried in the message or fails to identify the attribute configured to indicate association of the reverse LSP in the object, then the node may return an error message to the node which sends the PATH message to indicate that the object cannot be identified, and stops establishing the LSP, or the node may neglect the object or the attribute of the object which cannot be identified and continues to establish the LSP to be established by the PATH message.

Association objects are defined in RFC4872 and RFC4873. Therefore, on this basis, the objects in the embodiment may be association objects. FIG. 3 and FIG. 4 are schematic diagrams illustrating formats of IPv4 and IPv6 association objects respectively. Description will be given below in conjunction with FIG. 3 and FIG. 4.

Currently, the association type of an association object includes recovery and resource sharing. The object may be redefined and extended in the embodiment, e.g. an association type may be redefined in an association type field to indicate that a reverse unidirectional LSP needs to be bound for the unidirectional LSP; an association source may be applied to recording information of a node which initiates an association operation (i.e. information of a head node or an end node of an LSP); and an association ID may be set as a unique identifier (e.g. LSP ID) of the LSP under the node, i.e. the information of the node which initiates the association operation and the LSP ID may identify the LSP uniquely. More specifically, the association ID may be a tunnel ID of an LSP in the embodiment; the association source may be a tunnel sender address (i.e. a head node address) or a tunnel end point address (i.e. an end node address) of an LSP in the embodiment (description is given by taking the tunnel sender address for example in the embodiment, but is not limited thereto). Of course, the association object may be further extended to carry a Type/Length/Value (TLV) in which related information such as an LSP ID, and information of a head/end node of an LSP etc. is filled.

Similarly, a newly defined object may be configured to indicate that a reverse LSP needs to be bound for an LSP and carry the required information, e.g. an identifier of the LSP, and information of a head/end node of the LSP etc. In the embodiments below, description is given by taking association objects for example, but is not limited thereto.

The above Step S202 to Step S206 are described in detail below in combination with usage of association objects. If a reverse LSP needs to be bound for an LSP, then an association object is carried in a PATH message of a head node of the LSP, wherein the association type is set as association type; the association ID is set as the tunnel ID of the LSP, and the association source is set as the tunnel sender address (or the tunnel end point address) of the LSP. After receiving the PATH message, the last node (i.e. end node) of the LSP initiates establishment of another LSP (as a reverse LSP) according to the TE characteristics of the current tunnel. The newly established LSP also needs to carry an association object. The field filled in the object is consistent with the association field in the LSP to be bound. Or, an LSP which satisfies the requirements is found in the existing LSPs. An association object is carried in a PATH updating message of this LSP. The field filled in the object is consistent with the association field in the LSP to be bound. The head node, the end node and the intermediate nodes of the LSP compare the association objects in different LSPs, and perform bidirectional association binding for the two LSPs if the association types, association IDs and association sources are consistent.

Of course, a head node and an end node of two LSPs which are bound with each other may initiate a PATH message at the same time. In this case, association object is carried in both of the two messages. Since the two LSPs do not know each other, so that the association IDs and association sources filled in the association objects are the respective tunnel IDs and tunnel sender addresses of the association objects. Therefore, the contents of the association objects are inconsistent, which may lead to mismatching during the binding process. In this case, in a PATH updating message of a corresponding LSP, the head node or the end node with a greater router ID (of course, determination may be also performed not using the router ID) may replace the association object in the current LSP with the association object carried in the reverse LSP. Subsequently, the head node, the end node and the intermediate nodes perform LSP binding based on the updated PATH message.

Figure 5:
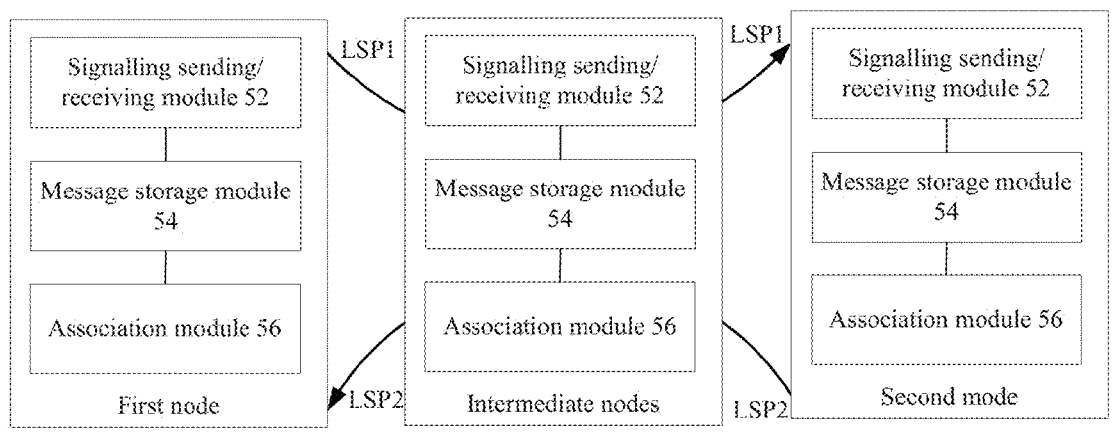
FIG. 5 is a structure diagram illustrating a system for establishing an associated bidirectional LSP according to one embodiment of the disclosure.

Corresponding to the description above, a system for establishing an associated bidirectional LSP is further provided in the embodiment. The system includes a plurality of nodes. The embodiments above and preferred embodiments thereof can be realized by the system, and what has been described will not be repeated below. Modules involved in the nodes of the system are described below. FIG. 5 is a structure diagram illustrating a system for establishing an associated bidirectional LSP according to one embodiment of the disclosure. The system is described below in conjunction with FIG. 5.

A node in the system includes: a signalling sending/receiving module 52, configured to send and/or receive a PATH message for establishing or updating an LSP to an end node, wherein the PATH message may carry an object for identifying association, and the attributes of the object for identifying association include: an association type attribute configured to indicate association of an reverse LSP with the LSP and an attribute configured to identify the LSP uniquely; a message storage module 54, connected to the signalling sending/receiving module 52 and configured to store status information of the LSP, wherein the status information includes the PATH message and the object for identifying association carried in the PATH message; and an association module 56, connected to the message storage module 54 and configured to search the object for identifying association stored in the PATH message stored in the message storage module and associate LSPs of which objects for identifying association have the same attribute values.

In the case that the node is taken as an end node, the signalling sending/receiving module 52 is further configured to, according to the TE attributes of an LSP, send to a head node a PATH message for establishing an LSP as a reverse LSP of the LSP, or the signalling sending/receiving module 52 is further configured to, according to the TE attributes of the LSP, select an LSP in LSPs which have been established, send a PATH updating message carrying an object for identifying association on the selected LSP to take the selected LSP as a reverse LSP, wherein the PATH message and the PATH updating message carry object for identifying association with the same attribute values as the attribute values of the object for identifying association carried in the PATH message for establishing the LSP.

Preferably, the signalling sending/receiving module 52 is further configured to, in the case that the attribute configured to indicate association of a reverse LSP with the LSP of the object for identifying association cannot be identified by the node to which the signalling sending/receiving module belongs, return an error message to a node which sent the PATH message to indicate that the attribute values of the object for identifying association cannot be identified.

Description will be given in detail hereinafter in conjunction with the preferred embodiments.

Preferred Embodiment 1

In this preferred embodiment, there are three situations in which two unidirectional LSPs are associated to become an associated bidirectional LSP, which will be described hereinafter respectively.

Situation 1: LSP1 is established first, and then LSP2 is established.

Step S301: Node A initiates a PATH message for establishing LSP1, and a reverse LSP needs to be bound for LSP1. Therefore, an association object needs to be carried in the PATH message. The association type is set as association; the association ID is set as a tunnel ID carried in a session object, which is represented by Tunnel ID1 here; and the association source is set as a tunnel sender address in a sender template object, i.e. an IP address of Node A (of course, the association source may be also set as a tunnel end point address in a session object, i.e. an IP address of Node B).

If binding is performed at the head node and the end node only, then the object needs to be processed by the head node and the end node only. If binding also needs to be performed at an intermediate node (e.g. Node D, which is the common intermediate node of LSP1/LSP2, also needs to be bound to a bidirectional relation), the intermediate node also needs to process the object. In this preferred embodiment, the intermediate node also needs to process the object. Therefore each jump of the object needs to be examined. The case that binding is performed for the head node and the end node only may be viewed as an exception of this preferred embodiment, and binding in this case is performed according to the same processing method.

Step S302: after receiving the PATH message from Node A, Node D examines the association object. If Node D fails to identify the association type, the association object is neglected and Node D continues to send a PATH message in the next jump (of course, if Node D fails to identify the association type, an path error message (PathErr) is sent to indicate that the association type cannot be identified, and establishment of the LSP may be ended, which will increase the probability of an LSP establishment failure). If the association type is association, a reverse LSP needs to be bound with the LSP.

Step S303: after receiving the PATH message from Node D, Node B examines the association object. If the association type is association, a reverse LSP needs to be bound with the LSP. If Node B fails to identify the association type, the association object is neglected and Node B continues the establishment process of the LSP.

Step S304: Node B initiates a PATH message to establish LSP2 according to the TE attribute (such as parameters of bandwidth, protection, priority etc.) of LSP1. LSP2 needs to be bound as a reverse tunnel of LSP1, and an association object needs to be carried in the PATH message by LSP2. This association object inherits from the object of LSP1, i.e. the association type is set as association; the association ID is set as the tunnel ID1 carried in the session object of LSP1; and the association source is set as the tunnel sender address in the LSP1 sender template object, i.e. the IP address of Node A. Of course, Node B may also find an LSP which satisfies the TE requirements from the existing LSPs. An association object is carried in a PATH updating message of the LSP. The field filled in the object is consistent with the association field of the LSP to be bound.

Step S305: after receiving the PATH message from Node B, Node D examines the association object. If Node D fails to identify the association type, the association object is neglected and Node D continues to send a PATH message in the next jump. If the association type is association, a reverse LSP needs to be bound for the LSP. Node D examines the PATH status which is stored locally to determine whether there is an LSP which needs to be associated. If not, association is not performed. Otherwise, LSP1 needs to be associated in this embodiment, and then by comparing the two association objects, it can be seen that the association types, association IDs and association sources are the same. Therefore, it is determined that the two LSPs need to be associated. In this case, a bidirectional forwarding item is generated as soon as the two LSPs are established successfully.

Step S306: after receiving a PATH message from Node D, Node C examines the association object. If Node C fails to identify the association type, the association object is neglected and Node C continues to send a PATH message in the next jump. If the association type is association, a reverse LSP needs to be bound for the LSP. Node C examines the PATH status which is stored locally to determine whether there is an LSP which needs to be associated. If not, association is not performed. Since LSP1 and LSP2 do not pass through Node C at the same time in this embodiment, Node C does not need to be associated.

Step S307: after receiving a PATH message from Node C, Node A examines the association object. If Node A fails to identify the association type, the association object is neglected. Node A is the end node of LSP2 in this embodiment, and therefore will not send a PATH message in the next jump. If the association type is association, a reverse LSP needs to be bound for the LSP. Node A examines the PATH status which is stored locally to determine whether there is an LSP which needs to be associated. If not, association is not performed. Otherwise, LSP1 needs to be associated in this embodiment. It can be seen by comparing the two association objects that the association types, association IDs and association sources are the same, therefore it is determined that the two LSPs need to be associated. In this case, a bidirectional forwarding item is generated as soon as the two LSPs are established successfully.

Contents filled in the association objects carried in LSP1 and LSP2 can be referred to in Table 1 below.

TABLE 1

|  | LSP1 | LSP2 |
| --- | --- | --- |
| Association Object | Association Type: Association<br>Association ID: Tunnel ID1<br>Association Source: A | Association Type: Association<br>Association ID: Tunnel ID1<br>Association Source: A |

Situation 2: LSP2 is established first, and then LSP1 is established. In this case, usage of association objects is the same as that in Situation 1 according to the same process, which will not be repeated here. Contents filled in the association objects carried in LSP1 and LSP2 can be also referred to in the following table.

TABLE 2

|  | LSP1 | LSP2 |
| --- | --- | --- |
| Association Object | Association Type: Association<br>Association ID: Tunnel ID2<br>Association Source: B | Association Type: Association<br>Association ID: Tunnel ID2<br>Association Source: B |

Situation 3: LSP1 and LSP2 are established at the same time, i.e. LSP1 and LSP2 are established independently without a sequence. Therefore, their respective tunnel ID and tunnel sender address are filled in the respective association object, which is shown in Table 3 as below.

TABLE 3

|  | LSP1 | LSP2 |
| --- | --- | --- |
| Association Object | Association Type: Association<br>Association ID: Tunnel ID1<br>Association Source: A | Association Type: Association<br>Association ID: Tunnel ID2<br>Association Source: B |

In this situation, the head node, the end node (Node A and Node B), and the intermediate nodes of the two LSPs fail to associate these two LSPs uniquely. In this case, the head node and the end node need to compare their router IDs (or other parameters) respectively. The node with a greater router ID (or the node with a smaller router ID) makes an association decision. For example, if the router ID of Node A is greater than that of Node B, in the PATH updating message of LSP1, Node A replaces the original association object existing in LSP1 with the association object in LSP2. On the basis that the association objects in the two LSPs are consistent according to the updated PATH message, association may be selected by the head node, the end node and the intermediate nodes.

To sum up, by applying the method for establishing an associated bidirectional LSP according to the embodiments above of the disclosure, shifting from an MPLS network to an MPLS-TP network can be satisfied, or a reverse LSP can be bound for a unidirectional LSP, thus multiple interactions between a control plane and a forwarding plane can be eliminated, an LSP which needs to be bound can be designated by the control plane to reduce interactions of processes.

Obviously, those skilled in the art should understand that the modules or steps of the disclosure may be implemented by general computing devices and centralized in a single computing device or distributed in a network consisting of multiple computing devices. Optionally, the modules or steps may be implemented by program codes executable by the computing devices, so that they may be stored storage devices and executed by the computing device. In addition, in some cases, the steps as illustrated or described may be performed according to a sequence different from the sequence herein, or they may be realized by being respectively made into individual integrated circuit modules or a plurality of modules or steps may be made into a single integrated circuit module. In this way, the disclosure is not limited to any specific combination of hardware and software.

The above are only preferred embodiments of the disclosure and should not be used to limit the disclosure. For those skilled in the art, the disclosure may have various modifications and changes. Any modifications, equivalent replacements, improvements and the like within the spirit and principle of the disclosure shall fall within the scope of protection of the disclosure.

What is claimed is:

1. A method for establishing an associated bidirectional Label-Switched Path (LSP), wherein the method comprises steps of: a head node sending a first PATH message for establishing or updating an LSP to an end node, wherein the first PATH message carries an object for identifying association; the end node sending to the head node a second PATH message for establishing or updating an LSP as a reverse LSP corresponding to the LSP established or updated by the head node, wherein the second PATH message carries an object for identifying association; and if attribute values of the objects for identifying association carried in the PATH messages sent by the head node and the end node are the same, the LSP and the reverse LSP being associated by the head node and the end node and becoming the associated bidirectional LSP, and if the LSP and the reverse LSP are established at the same time, the head node of the LSP or the end node of the reverse LSP carrying the same object for identifying association in a subsequent PATH updating message according to a preset strategy to associate the LSP and the reverse LSP.

2. The method according to claim 1, wherein both the attributes of the object for identifying association carried in the first PATH message sent by the head node and the attributes of the object for identifying association carried in the second PATH message sent by the end node comprise: an association type attribute configured to indicate association of a reverse LSP with the LSP, and an attribute configured to uniquely identify the LSP.

3. The method according to claim 1, wherein the same node in the LSP and the reverse LSP associates these two LSPs if the attribute values of the objects for identifying association carried in the PATH messages sent by the head node and the end node are the same.

4. The method according to claim 1, wherein the end node sending to the head node a second PATH message for establishing or updating an LSP as a reverse LSP comprises:
the end node sending a second PATH message to the head node according to a Traffic Engineering (TE) attribute of the LSP to establish the reverse LSP to the head node, which message carries an object for identifying association.

5. The method according to claim 1, wherein the end node sending a second PATH message for establishing or updating an LSP as a reverse LSP to the head node comprises:
the end node, according to a TE attribute of the LSP, selecting an LSP in LSPs which have been established, sending a second PATH updating message carrying an object for identifying association on the selected LSP, and taking the selected LSP as the reverse LSP.

6. The method according to claim 1, wherein the preset strategy is that in the head node of the LSP and the head node of the reverse LSP, the node with a greater or smaller ID value is an initiative side, and in the PATH updating message, the object for identifying association in an original PATH message of the initiative side is replaced by the object for identifying association in the PATH message of the other node.

7. The method according to claim 1, wherein the method further comprises:
in a case that the attribute configured to indicate association of a reverse LSP with the LSP of the object for identifying association cannot be identified, a node which receives the PATH message returning an error message to a node which sends the PATH message to indicate that the attribute value of the object for identifying association cannot be identified, and stopping establishing the LSP to be established by the PATH message.

8. The method according to claim 1, wherein the method further comprises: if the attribute configured to indicate association of a reverse LSP with the LSP of the object for identifying association cannot be identified, a node which receives the PATH message continuing establishing the LSP to be established by the PATH message.

9. The method according to claim 1, wherein the object is an association object and the association type of the association object is configured to indicate association of a reverse LSP for the LSP; and, the association object further carries an attribute configured to indicate node information of the head node or the end node, and a unique identifier of the LSP under the node, wherein the unique identifier of the LSP under the node and the attribute configured to indicate the node information of the head node or the end node are used to identify an LSP uniquely and globally.

10. The method according to claim 9, wherein the association ID in the association object is set as identification information of the LSP, and the association source of the association object is configured to indicate the node information of the head node or the end node; or, a Type/Length/Value (TLV) is extended and set in the association object, wherein the TLV carries node information configured to indicate the head node or the end node and identification information configured to identify the LSP under the node.

11. A system for establishing an associated bidirectional Label-Switched Path (LSP), comprising a plurality of nodes, wherein each of the plurality of nodes comprises: a signaling sending/receiving module, configured to send and/or receive a PATH message for establishing or updating an LSP to an end node, wherein the PATH message carries an object for identifying association; a message storage module, configured to store status information of the LSP, wherein the status information includes the PATH message and the object for identifying association carried in the PATH message; and an association module, configured to search the object for identifying association in the PATH message stored in the message storage module and associate LSPs of which the objects for identifying association have the same attribute value wherein if the LSP and a reverse LSP are established at the same time, the head node of the LSP or the end node of the reverse LSP carrying the same object for identifying association in a subsequent PATH updating message according to a present strategy to associate the LSP and the reverse LSP.

12. The system according to claim 11, wherein the attributes of the object for identifying association comprise: association type attribute configured to indicate association of a reverse LSP for the LSP, and attribute configured to uniquely identify the LSP.

13. The system according to claim 11, wherein if the node is taken as the end node, the signalling sending/receiving module is further configured to, according to the Traffic Engineering (TE) attribute of the LSP, send to the head node of the LSP a PATH message for establishing an LSP as a reverse LSP of the LSP, or the signalling sending/receiving module is further configured to, according to the TE attribute of the LSP, select an LSP in LSPs which have been established, and send a PATH updating message carrying an object for identifying association on the selected LSP to take the selected LSP as a reverse LSP, wherein the PATH message and the PATH updating message carry an object for identifying association with the same attribute values as the attribute values of the object for identifying association carried in the PATH message for establishing the LSP.

14. The system according to claim 13, wherein the signalling sending/receiving module is further configured to, if the attribute configured to indicate association of a reverse LSP with the LSP of the object for identifying association cannot be identified, return an error message to a node which sent the PATH message to indicate that the attribute values of the object for identifying association cannot be identified.

15. The method according to claim 5, wherein the object is an association object and the association type of the association object is configured to indicate association of a reverse LSP for the LSP; and, the association object further carries an attribute configured to indicate node information of the head node or the end node, and a unique identifier of the LSP under the node, wherein the unique identifier of the LSP under the node and the attribute configured to indicate the node information of the head node or the end node are used to identify an LSP uniquely and globally.

16. The method according to claim 15, wherein the association ID in the association object is set as identification information of the LSP, and the association source of the association object is configured to indicate the node information of the head node or the end node; or, a Type/Length/Value (TLV) is extended and set in the association object, wherein the TLV carries node information configured to indicate the head node or the end node and identification information configured to identify the LSP under the node.

17. The method according to claim 6, wherein the object is an association object and the association type of the association object is configured to indicate association of a reverse LSP for the LSP; and, the association object further carries an attribute configured to indicate node information of the head node or the end node, and a unique identifier of the LSP under the node, wherein the unique identifier of the LSP under the node and the attribute configured to indicate the node information of the head node or the end node are used to identify an LSP uniquely and globally.

18. The method according to claim 17, wherein the association ID in the association object is set as identification information of the LSP, and the association source of the association object is configured to indicate the node information of the head node or the end node; or, a Type/Length/Value (TLV) is extended and set in the association object, wherein the TLV carries node information configured to indicate the head node or the end node and identification information configured to identify the LSP under the node.

19. The method according to claim 8, wherein the object is an association object and the association type of the association object is configured to indicate association of a reverse LSP for the LSP; and, the association object further carries an attribute configured to indicate node information of the head node or the end node, and a unique identifier of the LSP under the node, wherein the unique identifier of the LSP under the node and the attribute configured to indicate the node information of the head node or the end node are used to identify an LSP uniquely and globally.

\* \* \* \* \*